(No Model.) 2 Sheets—Sheet 1.

C. R. HOFFMANN.
INFLATING DEVICE FOR PNEUMATIC TIRES.

No. 546,329. Patented Sept. 17, 1895.

Witnesses:

Inventor:
Carl R. Hoffmann
By Wm E. Coulter
attorney (No Model.) 2 Sheets—Sheet 2.

C. R. HOFFMANN.
INFLATING DEVICE FOR PNEUMATIC TIRES.

No. 546,329. Patented Sept. 17, 1895.

Witnesses:

Inventor:
Carl R. Hoffmann

UNITED STATES PATENT OFFICE.

CARL RUDOLPH HOFFMANN, OF KRAUSCHÜTZ, GERMANY.

INFLATING DEVICE FOR PNEUMATIC TIRES.

SPECIFICATION forming part of Letters Patent No. 546,329, dated September 17, 1895.

Application filed October 17, 1894. Serial No. 526,209. (No model.) Patented in England August 16, 1894, No. 15,642.

*To all whom it may concern:*

Be it known that I, CARL RUDOLPH HOFFMANN, a subject of the King of Prussia, German Emperor, residing at Krauschütz, near Elsterwerda, Kingdom of Prussia, German Empire, have invented certain new and useful Improvements in or Relating to Inflating Devices for Pneumatic Tires, (for which Letters Patent have been obtained in Great Britain, No. 15,642, dated August 16, 1894,) of which the following is a specification.

This invention relates to apparatus acting automatically during the rotation of a wheel to maintain or increase the air-pressure in a pneumatic tire.

The apparatus consists, essentially, of an air-pump applied to and used in connection with wheel-tires and provided with a safety-valve, whereby, through the compression of the tire during rotation, owing to the weight of the wheel, air is forced into the tire when insufficiently inflated until a certain tension is established. The working of the air-pump ceases as soon as the pressure within the wheel-tire equals that of a spring actuating the piston to drive it forward, thereby excessive pressure-strain on the tire is prevented. The action of this device is so energetic that a journey may be commenced with slack or loosely-inflated tires, and nevertheless after a short distance has been covered the tires will have become fully inflated. The apparatus, however, not only has the advantage that it provides for the right pressure being maintained in the tires without any co-operation on the part of the rider, but also its use is associated with the further and greater advantage that the wheel can be provided with a safety-valve. Sometimes there has been a fear (arising from the risk of a prejudicial loss of pressure) of applying a safety-valve to a pneumatic tire, although in view of the frequent bursting of the tire through great heat, such a precaution would be very beneficial; but with this new appliance, on the contrary, a safety-valve can now be fearlessly employed, because it at all times speedily compensates for any sudden loss of pressure.

The invention is illustrated, by way of example, in the accompanying drawings, which show two principal arrangements thereof, differing from each other in point of construction, but having all essential characteristics in common.

Figure 1:
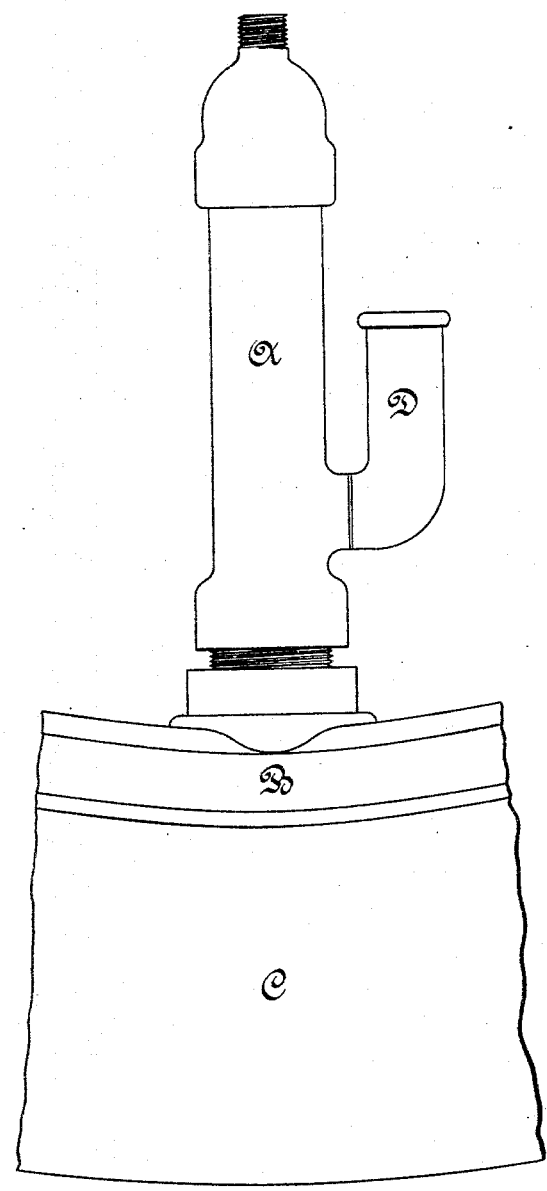
Figure 2:
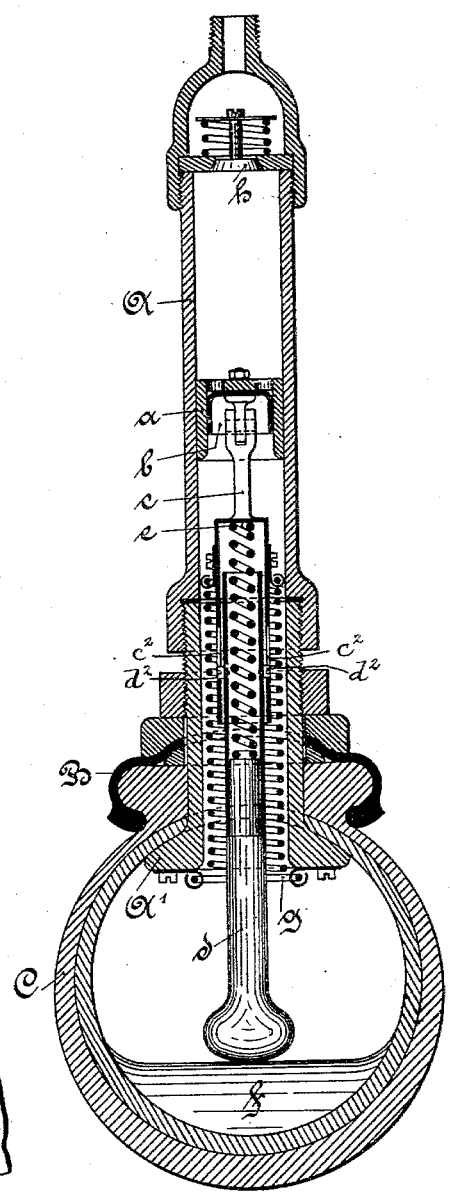
Figure 3:
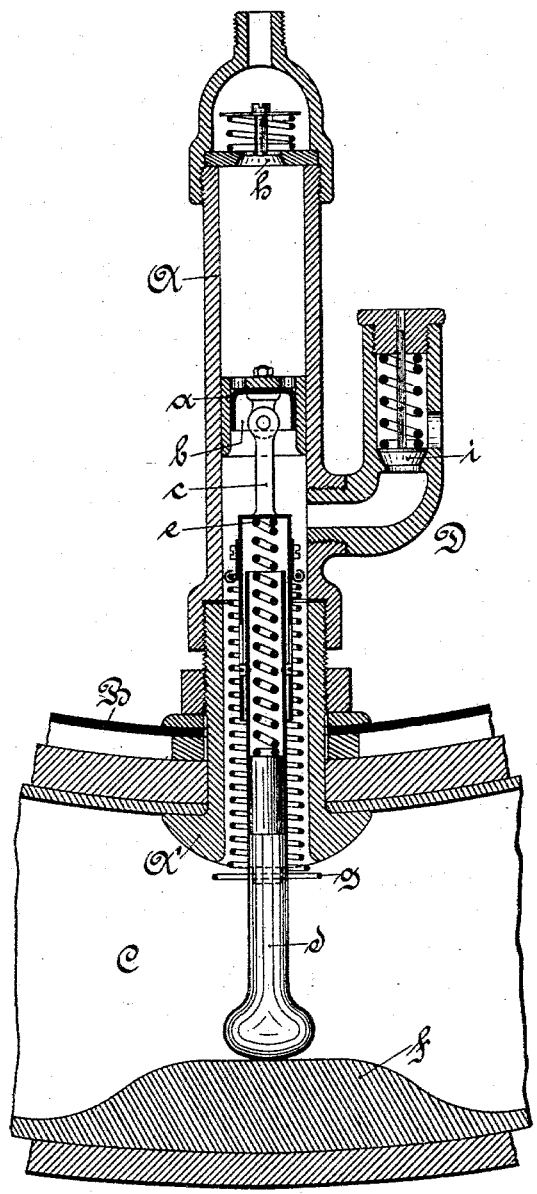
Figure 4:
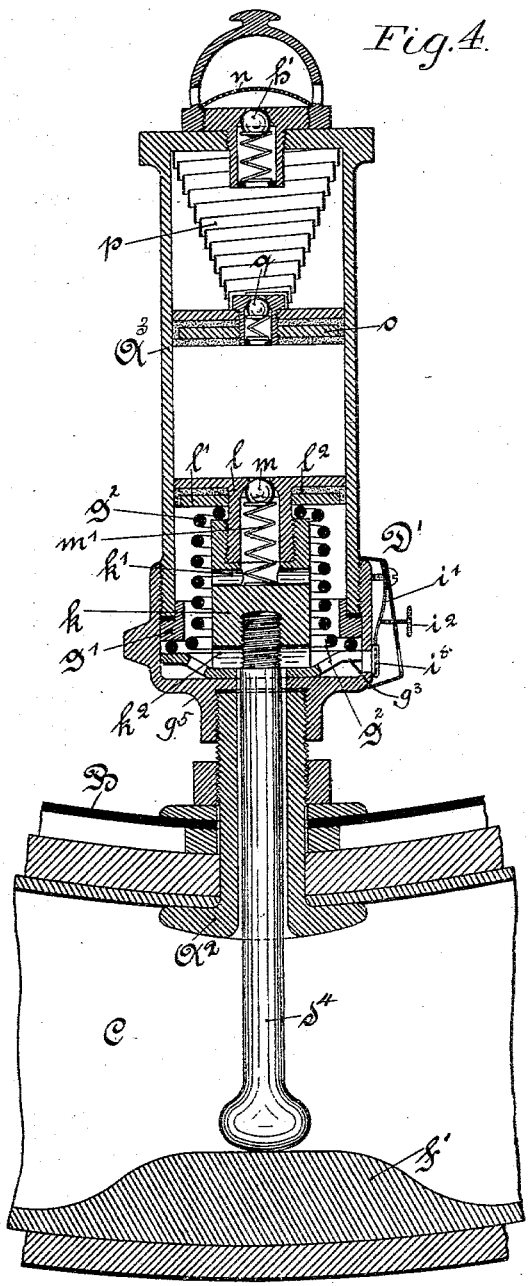

Figure 1 is an elevation of the device as applied to a cycle; Fig. 2, a vertical cross-section of the wheel-tire and device; Fig. 3, a longitudinal vertical section of Fig. 1. Fig. 4 is a view similar to Fig. 3, showing a modified construction.

The body A of the device, which is herein described as the cylinder or barrel of a piston air-pump, is like all known inflation or non-return valves hitherto used for pneumatic tires secured radially to the inner side of the wheel-rim B, (in the usual way,) which is perforated for the purpose. It is actually only a little larger than the valves in use, (the scale of the drawings being two to one—*i. e.*, twice the natural size.)

A is carried by the screwed nipple A', which passes through the inner wall of the pneumatic tire C and through the wheel-rim B, and by means of suitable washers, packings, and a screw-nut tightly presses the two together and makes an air-tight joint.

The piston $a$ travels within the body A, as in a cylinder, which is bored out for the purpose and provided with a flexible bucket or cup $b$, which when the device is inoperative closes the boring, and in conjunction therewith forms the pressure-valve of the air-pump. The piston-rod is jointed to the piston-head $a$, and consists of two parts $c$ and $d$, both partly tubular in form and having their tubular portions arranged to slide one within the other. By means of this contrary slide motion of these two parts a helical spring $e$ is subjected to more or less compression, which, as the spring is strong under normal conditions, insures the maintenance of the sliding parts $c\ d$ in their position of greatest extension or their restoration thereto when displaced. This movement, however, is limited by an arrangement of slots $c^2$ in $c$ and studs $d^2$ in $d$. This spring device, which ordinarily when the entire apparatus is operative is not itself called into action, is designed to prevent fracture or distortion under exceptionally-extensive piston-strokes or unexpected shocks. Such abnormal movements of the piston may occur whenever that point of the pneumatic tire which is diametrically opposite to the device runs over any projecting stone or other irregularity in or on the road-surface, &c. If in such case the piston were driven too far forward, the part $d$ of the piston-rod would be driven inward in the part $c$ and the spring $e$ would be compressed so as to absorb the shock.

The inner part $d$ (forming the outer extremity) of the piston-rod $c$ terminates in a rounded bulb-shaped head projecting into the hollow of the pneumatic tire opposite to a boss or thickened part $f$ of the inner wall of the pneumatic tube, as shown in the drawings, but which may be formed in the outer or protecting cover of the tire at that place. Secured to $c$ at near its upper end and to the lower extremity of $A'$ the helical spring $g$ tends to draw the piston $a$ radially outward against the air-pressure prevailing within the pneumatic tube C. Inside and adjacent to spring $g$ the helical central spring $e$, working in the hollow of the piston-rod between the parts $c$ and $d$, co-operates therewith and with the jointed connection between $c$ and $a$ (previously mentioned) to establish an elastic cushion between the fixed nipple $A'$ and the movable piston $a$—i. e., the pneumatic tube and the plunger-piston of the air-pump.

At the outer end of the pump-barrel A is located the inspiration or suction valve $h$, and on the other side of the piston the bent pipe D is secured to the pump-barrel and fitted with the safety-valve $i$.

The working of the above-described device is as follows: On a journey, as is well known, that portion of the periphery of the pneumatic tire which runs over the ground—i. e., the tread—becomes more or less flattened, even to the extent of half its thickness, in spite of the air-pressure within the pneumatic tube. This of course would take place at point $f$ (one such peripheral point). Thereupon the boss $f$ being pushed inward communicates the movement by the piston-rod $d$ $c$ to the piston $a$, which is thrust inward toward the center within the barrel A. The suction-valve $h$ is thereby closed, and the air above the piston is thus cut off from the outer atmospheric air and compressed until its pressure overcomes the pressure within the pneumatic tire acting on the other side of the piston $a$, when the flexible bucket $b$ yields so that the compressed air in A passes through to the other side of $a$ until the equilibrium is restored. At the commencement of the return under the influence of the reaction of the spring $g$ the bucket $b$ is forced back against the piston-head $a$, and the outlet being closed the augmented volume of air in the outer chamber of A—i. e., relatively to the axis of the wheel—is forced outward into the pneumatic tire C, while simultaneously the partial vacuum created in the (radially) inner chamber of A draws in fresh air from the outside through the suction-valve $h$. Seeing that the outward stroke of the piston is produced by the superior reactionary pressure of the spring $g$, it will cease as soon as the latter pressure and the antagonistic air-pressure in the pneumatic tire are brought into equilibrium by the decrease of the latter and the increase of the former, and the piston will then remain stationary in its innermost position (in relation to the axis of the wheel) until relaxation in C and the flattening inward of $f$ cause the latter to again act on the piston and drive it inward, when the same cycle of operations is repeated. Thus by means of the spring $g$, which can be made of any desired strength, the maximum pressure within the pneumatic tire can be determined and limited. On the other hand the safety-valve $i$ serves to release any temporary over-pressure in the pneumatic tire caused in exceptional cases—such as high temperature.

The modification illustrated in Fig. 4 has the advantage, in comparison with that just described, of minimizing all prejudicial waste of space between the spring-controlled working parts in the pump-barrel, and, further, the piston-rod is formed all in one piece without a sliding or oscillating joint, which is advantageous on account of the small dimensions of the piston-rod in any such apparatus, which is a cause of difficulty in the production and manipulation of two such sliding hollow parts, as previously described. In this modification, as in the preceding example, the pump-barrel $A^3$, which differs only in form from that previously described, is secured to the wheel-rim B and pneumatic tire C by means of a screwed nipple $A^2$, &c. The piston-rod $d^4$, however, consists of a solid rod, whereof the outer bulb-shaped end or head, as before, rests upon the boss or thickened part $f'$ of the pneumatic tire, while its inner end is screwed into the outer end of the socket-piece $k$, whose opposite end is provided with a female screw, into which is screwed the socket of the disk $l$ forming the piston. The main helical spring $g^2$, whereby the piston is controlled in this case, lies entirely within the pump-barrel $A^3$ and encircles piece $k$. It is secured, as shown, by means of its lowest coil being enlarged in size and confined between the sleeve $g'$ and the dished disk $g^3$, which are secured to $A^3$ by a screwed double-joint cap $g^5$, which, being also screwed on the outer end of the nipple $A^2$, firmly connects $A^3$ to $A^2$—i. e., the apparatus to the tire. At its inner end, which is somewhat contracted in diameter, the helical spring $g^2$ is held fast between the piston-disk $l$ and the socket-piece $k$, forming the screwed connection between those two parts, as above explained, and which at the same time secure the metal disk or washer $l'$ and the leather disk $l^2$ against $l$. The socket of this piston-disk $l$, screwing into $k$, has its hollow continued in conical shape through the disk itself to the upper surface thereof, forming a conical seat for the spring-controlled ball-valve $m$, kept on its seat by the spring $m'$, the socket itself forming the valve-chamber, from which the air taken in through the valve (on the inward stroke of the piston)

finds its way to the pneumatic tire through the radial passages $k'$ in the socket-piece $k$, the outer part of $A^3$, passages $k^2$ in the outer end of the socket-piece $k$, and the nipple $A^2$.

The suction-valve $h'$ at the free end of $A^3$ is also formed of a spring-controlled valve similar to $m$. A piece of fine gauze or equivalent $n$, covering the outside of the valve $h$, (but within the protecting-cam,) protects it against the entrance of dust. Between these valves $h'$ and $m$ the pump-barrel is fitted with a duplicate or false end (or piston) $o$, which is held in the normal position, as shown, by the comparatively-strong spring $p$. The disk $o$, like the piston-disk $l$, is provided with a leather disk, a metal disk, and a ball-valve $q$. Its position is so selected that under normal conditions and a regular working of the invention, the piston $l$ approaches quite close to $o$ or even pushes it slightly backward. There is therefore no space prejudicially wasted in the cylinder or pump-barrel A. Should the piston, however, suddenly chance to make an abnormally large stroke, the yielding of the spring $p$ would allow of the increased displacement of $o$ and absorb the shock of impact. In this manner, although the piston-rod is solid and unyielding, all risk of fracture or distortion of the parts is avoided. In this modification also the safety-valve is different in form, as shown on the drawings, the band-pipe D, of Figs. 1 and 3, being dispensed with in favor of a small, flat, sheet-metal cap D′, wherein the valve-closing device assumes the form of a flat disk or plate $i^5$ carried by a spring-arm $i'$, which is adjustable by means of a set-screw $i^2$, so as to vary the pressure on the safety-valve at will.

I claim—

1. The combination with a wheel rim and tire of a bicycle or similar vehicle, of a cylinder carried by the wheel rim and communicating with the interior of the tire, a sectional piston rod working within said cylinder and projecting within the tire and adapted to be forced inwardly by the latter when it is compressed as described, a piston carried by one of the sections of the piston rod, said piston and piston rod adapted to have independent longitudinal movement and said piston having a port to provide communication between the spaces above and below the piston a flexible cup carried by the under side of the piston and adapted to open and close the said port in the piston as described, the upper end of the cylinder having a port, an inlet valve carried by the cylinder and adapted to open and close the said port in the outer end of the cylinder, a spring arranged intermediate the sections of the piston rod and adapted to be compressed by the inward movement of one section of the rod or the outward movement of the other section of the piston rod and a second spring encircling the piston rod and acting to draw the piston rod radially outward against the air pressure within the tire, all as specified.

2. The combination with a wheel rim and tire of a bicycle or similar vehicle, of a cylinder carried by the wheel rim and communicating with the interior of the tire, a sectional piston rod working within said cylinder and projecting within the tire and adapted to be forced inwardly by the latter when it is compressed as described, a piston carried by one of the sections of the piston rod, said piston and piston rod adapted to have independent longitudinal movement and said piston having a port to provide communication between the spaces above and below the piston a flexible cup carried by the under side of the piston and adapted to open and close the said port in the piston as described, the upper end of the cylinder having a port, an inlet valve carried by the cylinder and adapted to open and close the said port in the outer end of the cylinder, a spring arranged intermediate the sections of the piston rod and adapted to be compressed by the inward movement of one section of the rod or the outward movement of the other section of the piston rod, a second spring encircling the piston rod and acting to draw the latter radially outward against the air pressure within the tire, and a safety-valve adapted to control the communication between the space upon the under side of the piston and consequently the interior of the tire and the outer air, as specified.

3. The combination with a wheel rim and tire of a bicycle or similar vehicle, of a cylinder carried by the wheel rim and communicating with the interior of the tire, a piston rod made in sections telescopically arranged, one of said sections projecting within the tire and adapted to be forced inwardly by the latter when it is compressed as described, a spring arranged between the sections of the rod, a piston carried by the inner section of said rod and having a port to open communication between the spaces above and below the piston, a cut-off device or valve carried by said piston and adapted to open and close said port in the manner specified, an air inlet valve at the outer end of the cylinder adapted to control the communication between the interior of the cylinder and the outer air, and a spring acting upon the piston and its rod to move them outwardly as specified, and a safety valve adapted to control the communication between the space upon the under side of the piston and consequently the interior of the tire and the outer air.

4. The combination with a wheel rim and tire of a bicycle or similar vehicle, of a nipple engaging the rim and tire, a cylinder secured to the nipple and communicating with the interior of the tire, a piston rod working within said cylinder and projecting within the tire, a boss or enlargement on the latter against which said rods bear, a piston jointed to said rod and having a port to open communication between the spaces above and below the piston, a cut-off device or valve adapted to open and close said port in the manner specified, an air inlet valve at the other end of the cylinder adapted to control the communication between the interior of the cylinder and the outer air, a spring surrounding the piston rod and secured fixedly at one end to the nipple and at its opposite end to the piston rod, a valve casing carried by the cylinder at one side, and a safety valve arranged in said casing and adapted to control the communication between the space upon the under side of the piston and consequently the interior of the tire and the outer air.

CARL RUDOLPH HOFFMANN.

Witnesses:
OTTO WOLFF,
HUGO DUMMER.